No. 701,751. Patented June 3, 1902.
P. MAYOTTE.
FASTENING DEVICE FOR DRIVING HORSES.
(Application filed Nov. 12, 1901.)

(No Model.)

WITNESSES:
A. R. Appleman Jr.
W. B. Kaempffert

INVENTOR
Phillis Mayotte
BY
ATTORNEYS

UNITED STATES PATENT OFFICE.

PHILLIS MAYOTTE, OF WELLS, MICHIGAN, ASSIGNOR TO HIMSELF AND RICHARD McLEAN, OF WELLS, MICHIGAN.

FASTENING DEVICE FOR DRIVING-HORSES.

SPECIFICATION forming part of Letters Patent No. 701,751, dated June 3, 1902.

Application filed November 12, 1901. Serial No. 81,990. (No model.)

*To all whom it may concern:*

Be it known that I, PHILLIS MAYOTTE, a citizen of the United States, and a resident of Wells, in the county of Delta and State of Michigan, have invented a new and Improved Fastening Device for Driving - Horses, of which the following is a full, clear, and exact description.

The object of my invention is to provide a simple and efficient means of fastening drafthorses or other animals securely without the need of a hitching-post. To this end I employ a spindle supported by the vehicle, said spindle being provided with means for fastening the reins and being operatively connected with one of the wheels of the vehicle. The arrangement is such that when the animal starts forward the consequent pull on the reins will turn the spindle and tend to rotate the vehicle-wheel with which the spindle is connected in the opposite direction, thereby checking the onward course of the animal.

My invention will be fully described hereinafter and the features of novelty pointed out in the appended claims.

Reference is to be had to the accompanying drawings, forming a part of this specification, in which similar characters of reference indicate corresponding parts in both figures.

Figure 1:
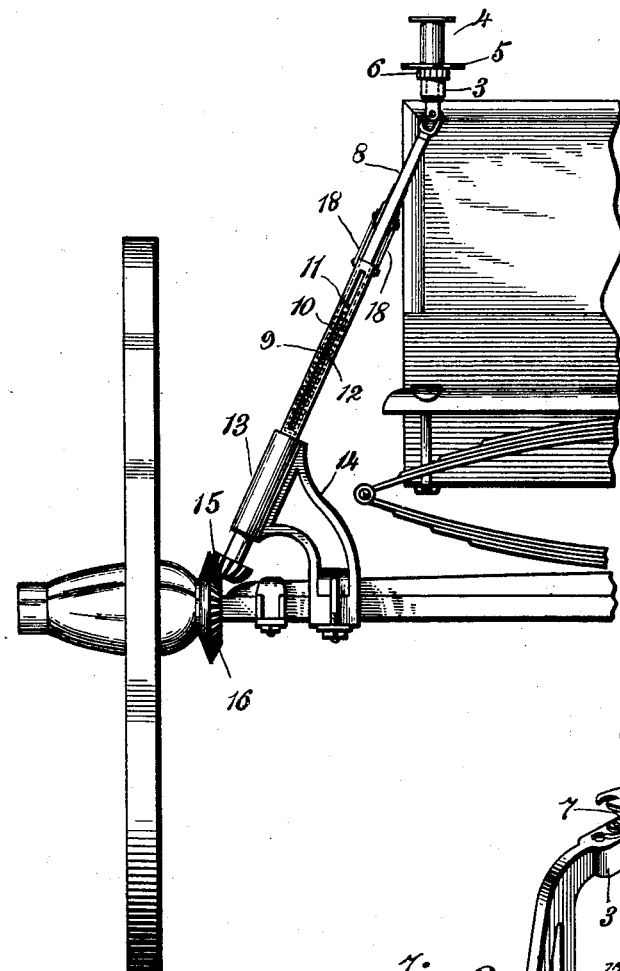
Figure 2:
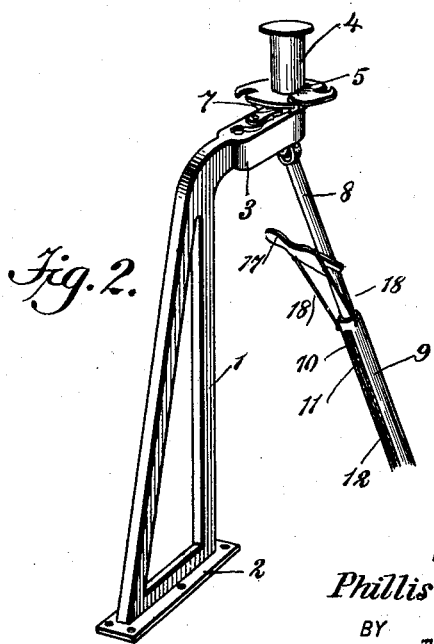

Figure 1 is an end view of a vehicle to which my invention is applied, and Fig. 2 is a detail perspective view of a supporting-frame for the spindle and connected parts.

The upright supporting-frame 1, having a foot 2, is securely fastened to the floor of the vehicle body or box by means of bolts passing through the said foot 2. The supporting-frame 1 is provided with an arm 3, projecting forwardly over the dashboard of the vehicle, in which arm 3 a spindle 4 is mounted to turn. The said spindle 4 carries a disk 5, provided with hooks to serve as a fastening means for the reins. Beneath the disk 5 a ratchet-wheel 6 is mounted on the spindle, said ratchet-wheel being engaged by a spring-pressed pawl 7, mounted on the arm 3. The lower end of the spindle 4 protrudes from the arm 3 and is connected by a suitable joint with the rod 8, which is preferably hollow. The rod 8 telescopes in a tube 9, formed on opposite sides with longitudinally - ranging slots 10, through which lugs 11, formed on the lower end of the rod 8, project. These lugs serve to impart the rotary movement of the rod to the tube 9. A spring 12 is coiled in the tube, said spring abutting against the closed lower end of the tube and against the end of the rod 8. The said spring yields when the road is uneven, so that the parts of the device may not be unduly displaced from their normal position.

The tube 9 passes loosely through a sleeve 13, carried by a bracket 14, securely bolted to the front axle of the vehicle, said sleeve serving to hold the tube 9 in proper position. At its lower end the tube 9 is provided with a gear 15, which meshes with a gear 16, carried by the hub of one of the front vehicle-wheels. As shown in Fig. 1, the gear 15 is formed with teeth of curved form, so that they may play between the teeth of the gear 16, attached to the vehicle-wheel, when the vehicle travels over uneven roads.

On the rod 8 a lever 17 is pivoted, said lever being connected by links 18 with the upper end of the tube 9. By means of the lever 17 the tube 9 may be moved longitudinally to disengage the gear 15 from the gear 16. It is therefore possible on long drives to disconnect the gears 15 and 16, so that the vehicle-wheel will not affect the tube 9.

When it is desired to fasten a horse, the lever 17 is operated to engage the gear 15 with the gear 16, and the reins are wound around the spindle and engaged with the hooks of the the disk 5. If the horse should start forward, the disk 4 would be turned, which movement is communicated, by means of the rod 8, the tube 9, and the gear 15, to the vehicle-wheel through the movement of the gear 16, tending to turn said vehicle-wheel in a direction opposite to the direction of rotation of the spindle 4. The horse will therefore be quickly checked. A backward movement of the horse will have no effect upon the spindle 4 and connected parts, since the spring-pressed pawl and the ratchet 6 prevent the rotation of the spindle 4 in the opposite direction. Hence whichever way the horse may move the wheels cannot be turned.

Having thus described my invention, I claim as new and desire to secure by Letters Patent—

1. A fastening device, comprising a supporting-frame; a spindle mounted to turn in the supporting-frame; a rein-holding disk carried by the spindle; a ratchet carried by the spindle; a pawl engaging the ratchet; a spring-pressed rod connected with the spindle; a tube in which the said rod is received; a gear carried on the end of the tube; a gear on the vehicle-wheel, said gear meshing with the tube-gear; and a lever mounted on the rod and connected with the tube.

2. A rein-holder, comprising a supporting-frame; a rein-fastening device mounted to turn in the supporting-frame; means for preventing the rotation of the rein-fastening device in one direction; a spring-pressed rod connected with one end of the rein-fastening device; a tube within which the rod is received; a gear carried on the end of the tube; a gear on the vehicle-wheel; said gear meshing with the tube-gear; and a lever mounted on the rod and connected with the tube.

3. A rein-holder, comprising a supporting-frame; a rein-fastening device mounted to turn in the supporting-frame; means for preventing the rotation of the rein-fastening device in one direction; a spring-pressed rod connected with one end of the rein-fastening device; and a tube within which the rod is received, said tube being operatively connected with a wheel of a vehicle.

4. In a rein-holder, the combination of a spindle and two telescoping members, one of which is connected with the spindle and the other of which is adapted to be engaged with or disengaged from a vehicle-wheel.

5. A rein-holder, comprising a supporting-frame; a rein-fastening device mounted to turn in the supporting-frame; a spring-pressed rod connected with one end of the rein-fastening device; a tube within which the rod is received, said tube being operatively connected with a wheel of the vehicle; and means for disconnecting the tube and the said wheel.

In witness whereof I have signed my name to this specification in the presence of two subscribing witnesses.

PHILLIS MAYOTTE.

Witnesses:
C. EMERY SNYDER,
C. W. MOLIN.